United States Patent
Chang et al.

(10) Patent No.: US 11,440,508 B1
(45) Date of Patent: Sep. 13, 2022

(54) WIPER

(71) Applicant: Danyang UPC Auto Parts Co., Ltd., Jiangsu (CN)

(72) Inventors: Che-Wei Chang, Jiangsu (CN); Cheng-Kai Yang, Jiangsu (CN)

(73) Assignee: DANYANG UPC AUTO PARTS CO., LTD., Zhenjiang (CN)

( * ) Notice: Subject to any disclaimer, the term of this patent is extended or adjusted under 35 U.S.C. 154(b) by 0 days.

(21) Appl. No.: 17/195,123

(22) Filed: Mar. 8, 2021

(51) Int. Cl.
*B60S 1/40* (2006.01)
*B60S 1/38* (2006.01)

(52) U.S. Cl.
CPC . *B60S 1/40* (2013.01); *B60S 1/38* (2013.01); *B60S 1/3851* (2013.01); *B60S 1/3858* (2013.01); *B60S 1/3882* (2013.01); *B60S 1/3806* (2013.01); *B60S 2001/3818* (2013.01)

(58) Field of Classification Search
CPC ........ B60S 1/40; B60S 1/3849; B60S 1/3874; B60S 1/3848; B60S 1/3882; B60S 1/3851; B60S 1/38; B60S 1/3806; B60S 1/381; B60S 1/3879; B60S 2001/3818; B60S 1/3858
USPC ........................................ 15/250.201, 250.43
See application file for complete search history.

(56) References Cited

U.S. PATENT DOCUMENTS

| | | | | |
|---|---|---|---|---|
| 3,785,002 | A * | 1/1974 | Quinlan | B60S 1/4067 15/250.43 |
| 4,014,061 | A * | 3/1977 | Jurowski | B60S 1/38 15/250.43 |
| 7,503,095 | B2 * | 3/2009 | Lin | B60S 1/381 15/250.201 |
| 2008/0052865 | A1 * | 3/2008 | Chiang | B60S 1/38 15/250.43 |
| 2011/0107542 | A1 * | 5/2011 | Op't Roodt | B60S 1/3851 15/250.31 |

FOREIGN PATENT DOCUMENTS

| | | |
|---|---|---|
| CN | 109094526 A | 12/2018 |
| DE | 202007011262 U1 | 10/2007 |
| EP | 2233375 * | 9/2010 |

OTHER PUBLICATIONS

Search Report dated Aug. 30, 2021 of the corresponding European patent application No. EP21162882.1.

* cited by examiner

Primary Examiner — Gary K. Graham
(74) Attorney, Agent, or Firm — Chun-Ming Shih; HDLS IPR Services

(57) ABSTRACT

A wiper having a snapping seat, a pair of elastic arms and a pair of connection strips and a scraper is provided in this disclosure. One end of each elastic arm is connected to the snapping seat and the pair of elastic arms are respectively extended from the snapping seat in opposite directions. Two sides of each connection strip are respectively provided with a lower rail and the elastic arm is sheathed in the lower rail. An upper rail is disposed on a side of the scraper, and the upper rail is sheathed in the respective lower rails.

9 Claims, 12 Drawing Sheets

WIPER

BACKGROUND OF THE DISCLOSURE

Technical Field

This disclosure is related to a wiper, and in particular related to a wiper which is convenient to assemble with a scraper.

Related Art

A related-art wiper at least has an elastic strip, a scraper and a snapping seat, the scraper is disposed on a side of the elastic strip, and the snapping seat is disposed on the other side of the elastic strip, the snapping seat is used for snapping a wiper arm. When the wiper is pressed on a glass by the wiper arm, the elastic strip can press the scraper to abut against the glass with the elastic force.

When the related-art wiper is assembled, the snapping seat is firstly riveted on the elastic strip and the scraper is further sheathed in the snapping seat. Therefore, the snapping seat is interfered by the scraper during sheathing, and it is inconvenient to assemble.

In views of this, in order to solve the above disadvantage, the inventor studied related technology and provided a reasonable and effective solution in this disclosure.

SUMMARY OF THE DISCLOSURE

A wiper which is convenient to assemble with a scraper is provided in this disclosure.

A wiper having a snapping seat, a pair of elastic arms and a pair of connection strips and a scraper is provided in this disclosure. One end of each elastic arm is connected to the snapping seat and the pair of elastic arms are respectively extended from the snapping seat in opposite directions. Two sides of each connection strip are respectively provided with a lower rail and the elastic arm is sheathed in the lower rail. An upper rail is disposed on a side of the scraper, and the upper rail is sheathed in the lower rail.

According to the wiper of this disclosure, a block is connected between the pair of connection strips, and the block is snapped on the snapping seat. The block has a bridging segment connected with the pair of lower rails in a manner of continuous shaper, the upper rail is sheathed in the bridging segment.

According to the wiper of this disclosure, a groove rail is disposed on each connection strip, and the elastic arm is inserted in the groove rail. The groove rail has a plurality of frames connected with each other. The frame has a pair of claws respectively clamping two side edges of the elastic arm. The wiper further has a pair of spoiler cover covering each of the elastic arms, and each of the spoiler covers covering each of the groove rails correspondingly.

The wiper of this disclosure further has a pair of spoiler covers covering each of the elastic arms, two sides of each elastic arm are respectively provided with the spoiler cover and the connection strip correspondingly. The wiper of this disclosure further has a shield covering the snapping seat and an end of each of the spoiler covers connected to the snapping seat. According to the wiper of this disclosure, a portion of the block is connected with the spoiler-cover in a manner of continuous shape.

According to the wiper of this disclosure, the other end of each elastic arm is provided with a stopper to block each of the connection strips. Each of the stoppers respectively blocks the scraper.

According to this disclosure, a pair of separated elastic arms are respectively connected to the snapping seat and further connected to the connection strips by sheathing for conveniently inserting the scraper into each connection strip.

BRIEF DESCRIPTION OF DRAWINGS

This disclosure can be more fully understood by reading the following detailed description of the embodiment, with reference made to the accompanying draw.

DETAILED DESCRIPTION

Figure 1:
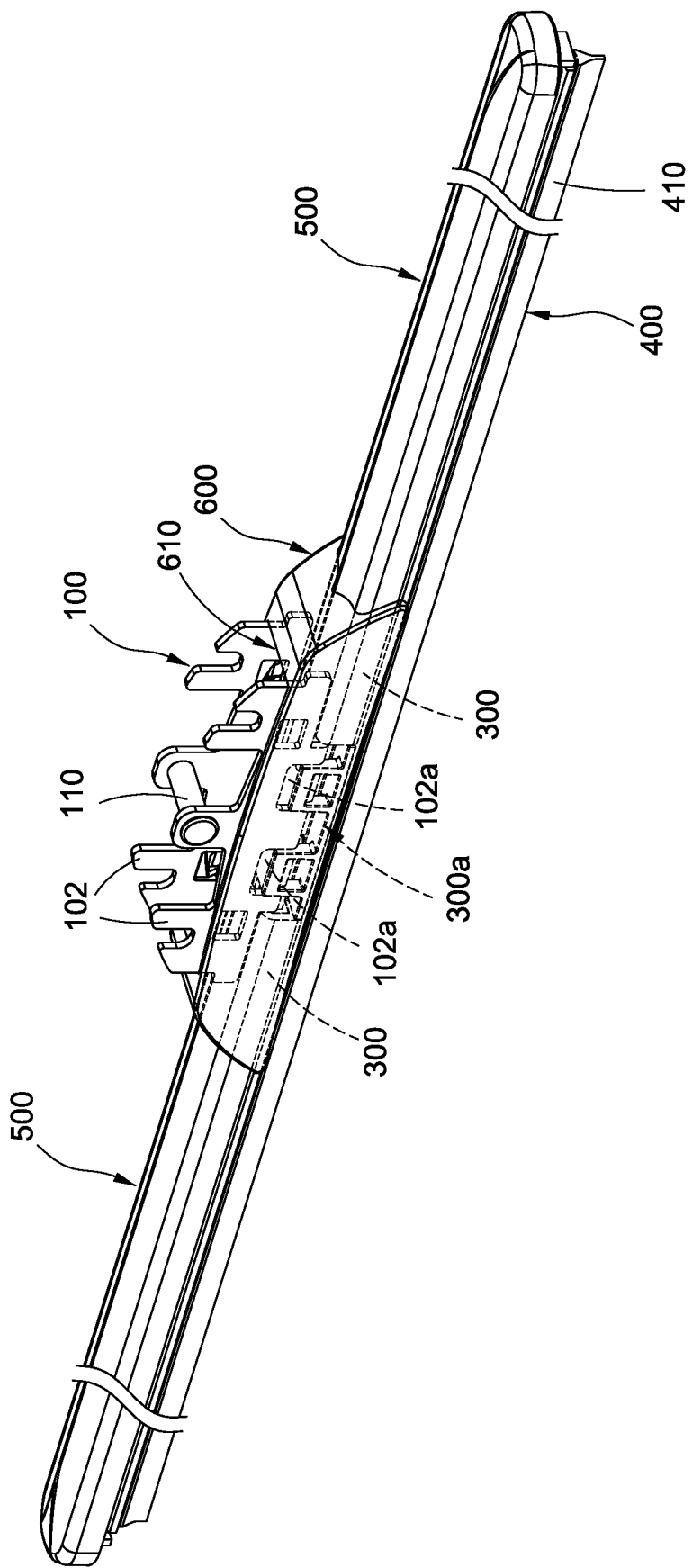
FIGS. 1 and 2 are perspective views showing the wiper according to an embodiment of this disclosure.
Figure 2:
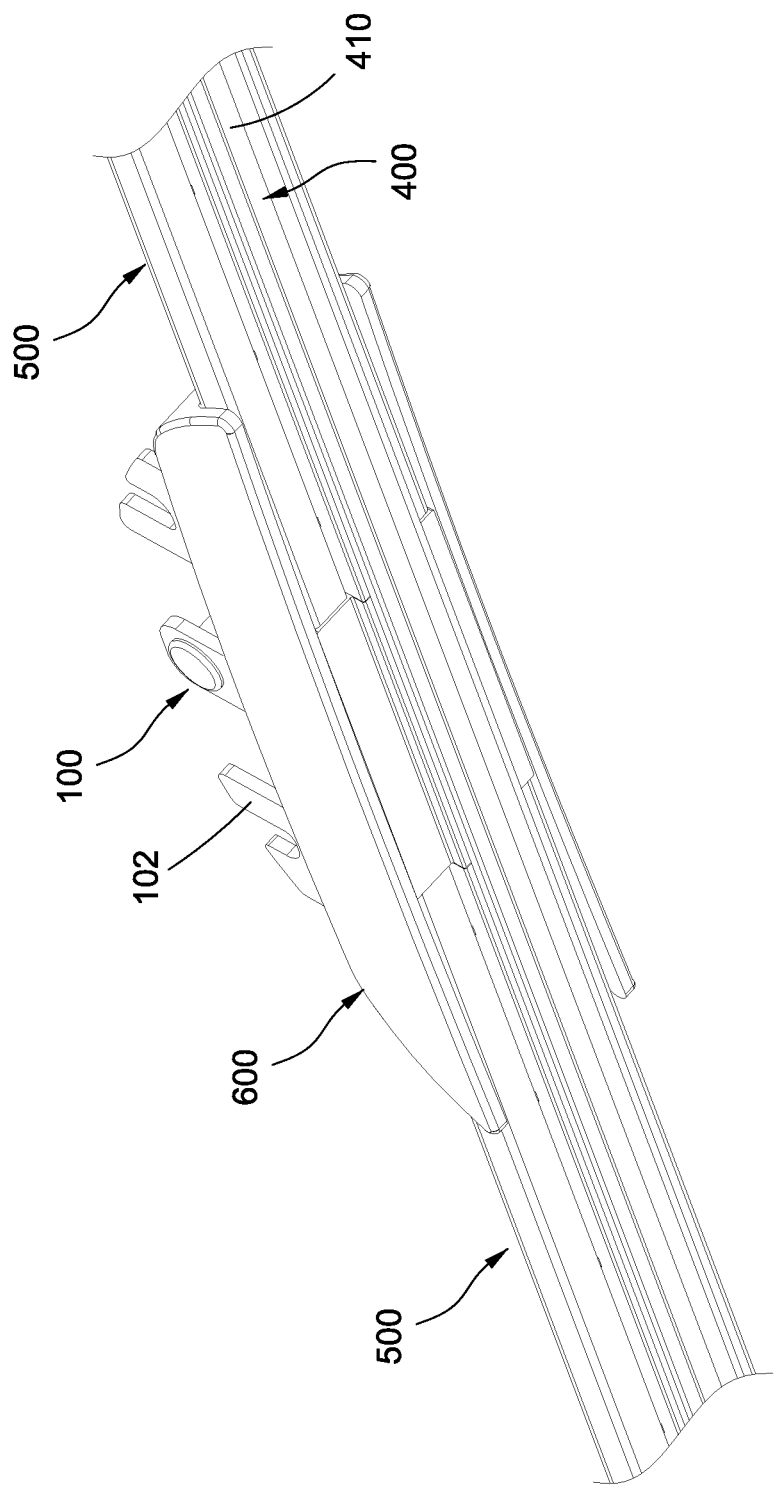

Referring to FIGS. 1 to 4, a wiper having a snapping seat 100, a pair of elastic arms 200 and a pair of connection strip 300 corresponding to the pair of elastic arms 200, a scraper 400, a pair of spoiler-covers 500 and a shield 600 is provided in an embodiment of this disclosure. The snapping seat 100 is used for snapping a wiper arm (not shown in figures).

According to this embodiment, a shaft 110 is directly disposed on the snapping seat 100 for the wiper arm to be connected pivotally thereon. The shaft 110 may be separately disposed on another element and assembled to the snapping seat 100. Specifically, the snapping seat 100 has a bottom plate 101 and a pair of side walls 102 arranged vertically on the bottom plate 101, the pair of side walls 102 are arranged spacedly and parallelly with each other, the shaft 110 is disposed between the pair of side walls 102 and two ends of the shaft 110 are respectively connected to each side wall 102.

Figure 4:
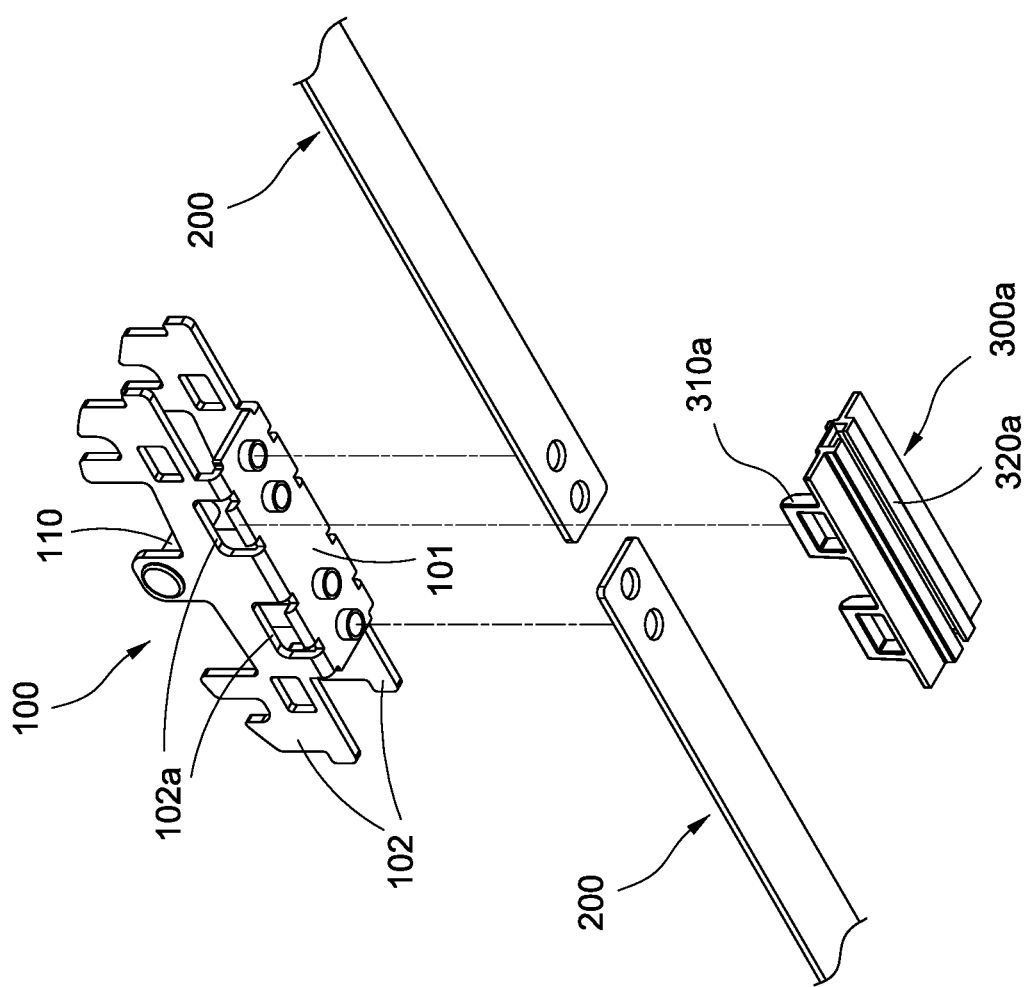

According to this embodiment shown in FIG. 4, each elastic arm 200 is strip-type metal sheet, each elastic arm 200 has an end connected with the snapping seat 100, and the pair of elastic arms 200 are extended from the snapping seat 100 in opposite directions. Specifically, each elastic arm 200 is of an arc shape, and the two elastic arms 200 are connected with each other to make the wiper be of the arc shape. According to this embodiment, each elastic arm 200 is riveted with the snapping seat 100 on the end, but this disclosure is not be limited thereto. For example, the elastic arm 200 may be fixed on the snapping seat 100 by screwing, wielding or snapping.

Figure 3:
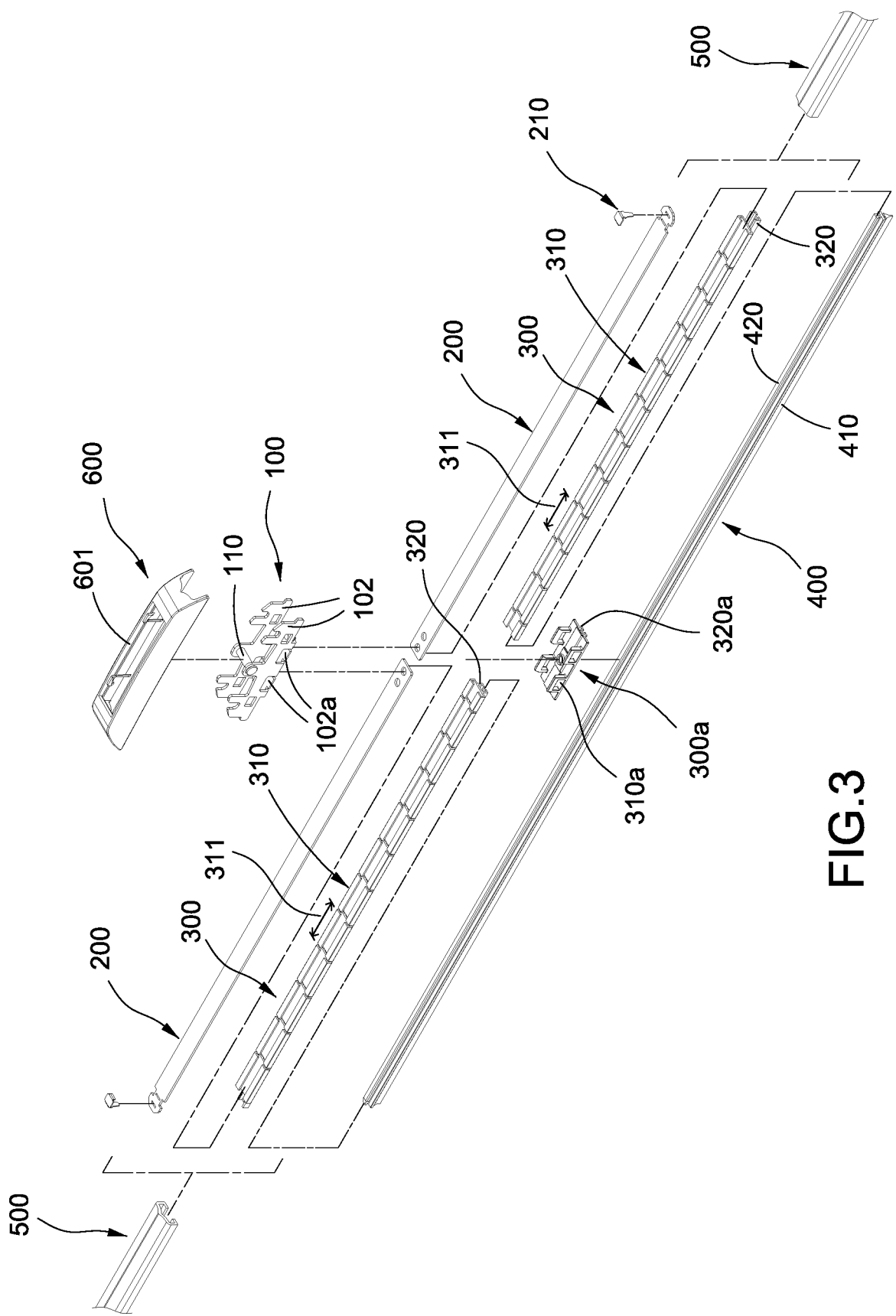
FIGS. 3 and 4 are exploded views showing the wiper according to the embodiment of this disclosure.
Figure 5:
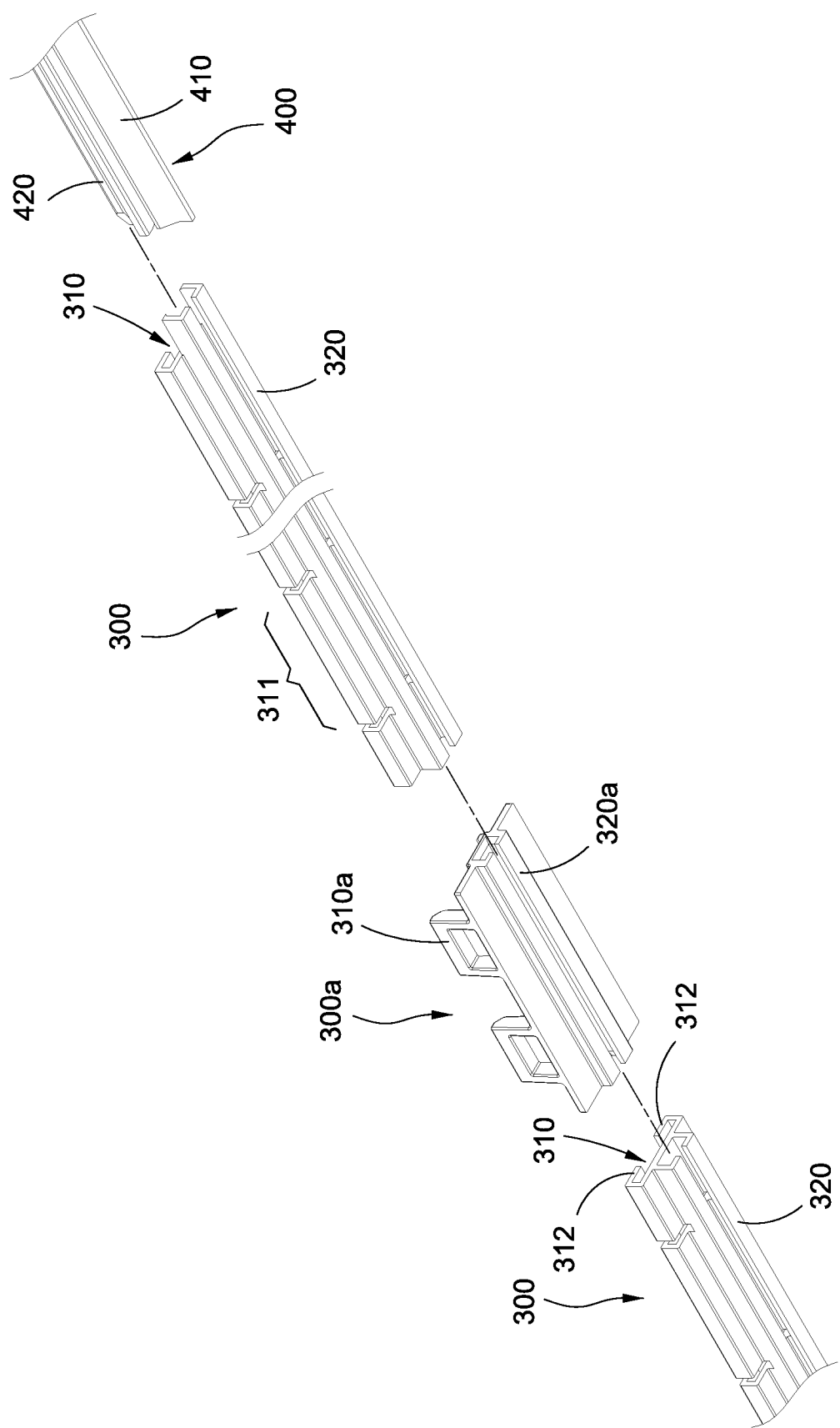
FIG. 5 is a perspective view showing the connection strip connected with the block.
Figure 6:
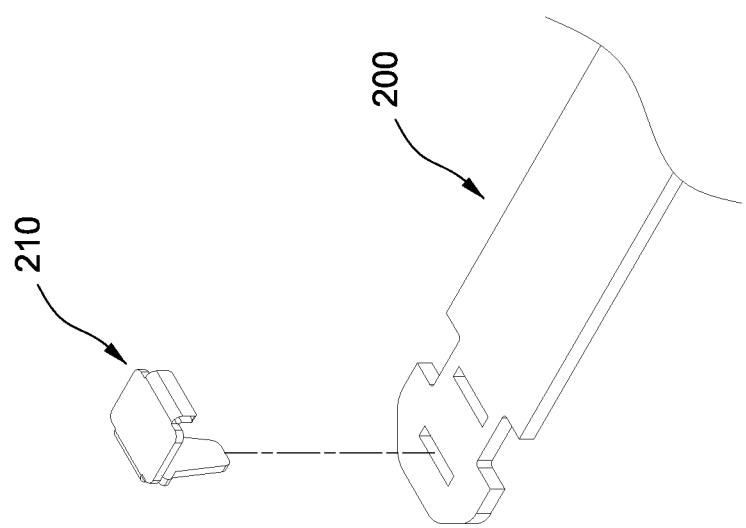
FIG. 6 is a perspective view showing the stopper.
Figure 7:
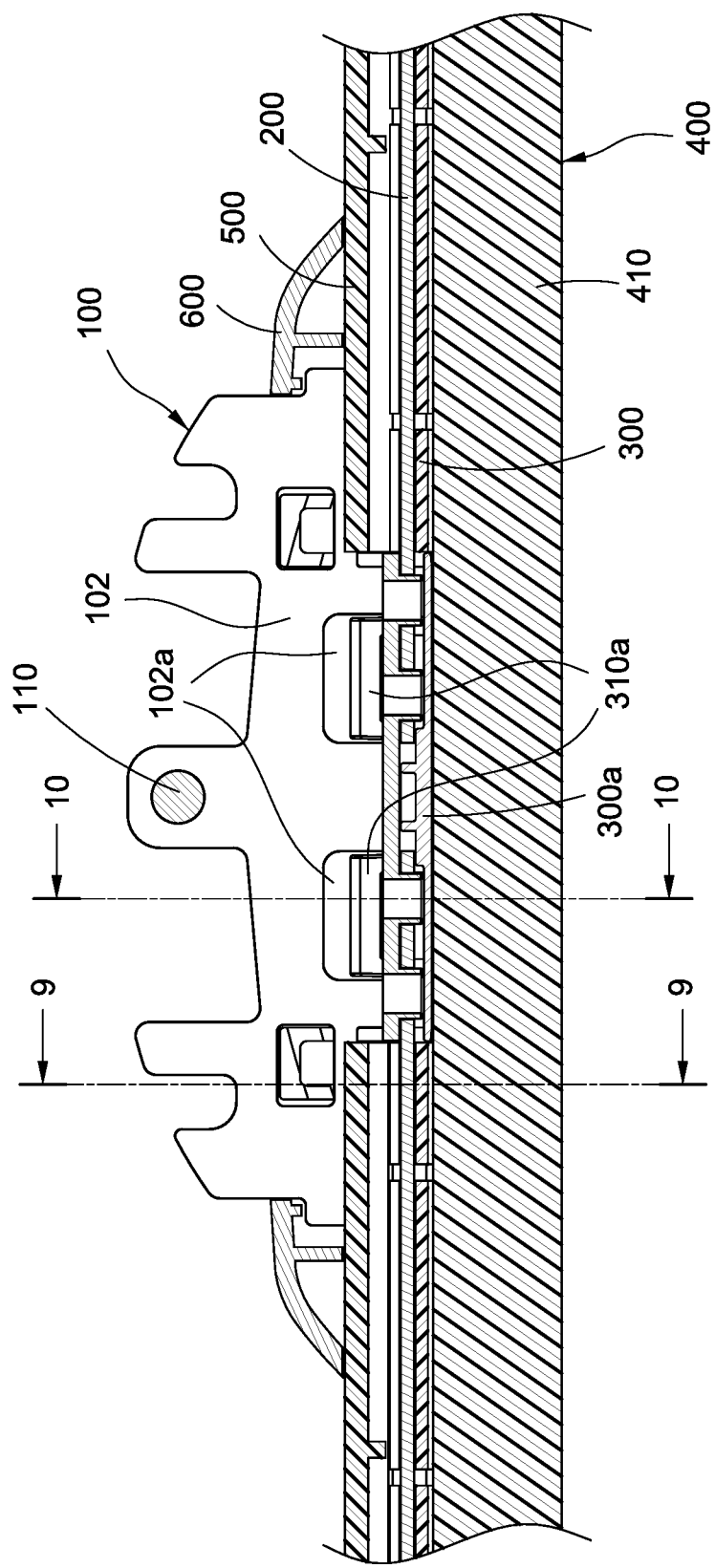
FIGS. 7 and 8 are longitudinal partial cross-sectional views of the wiper according to the embodiment of this disclosure.
Figure 8:
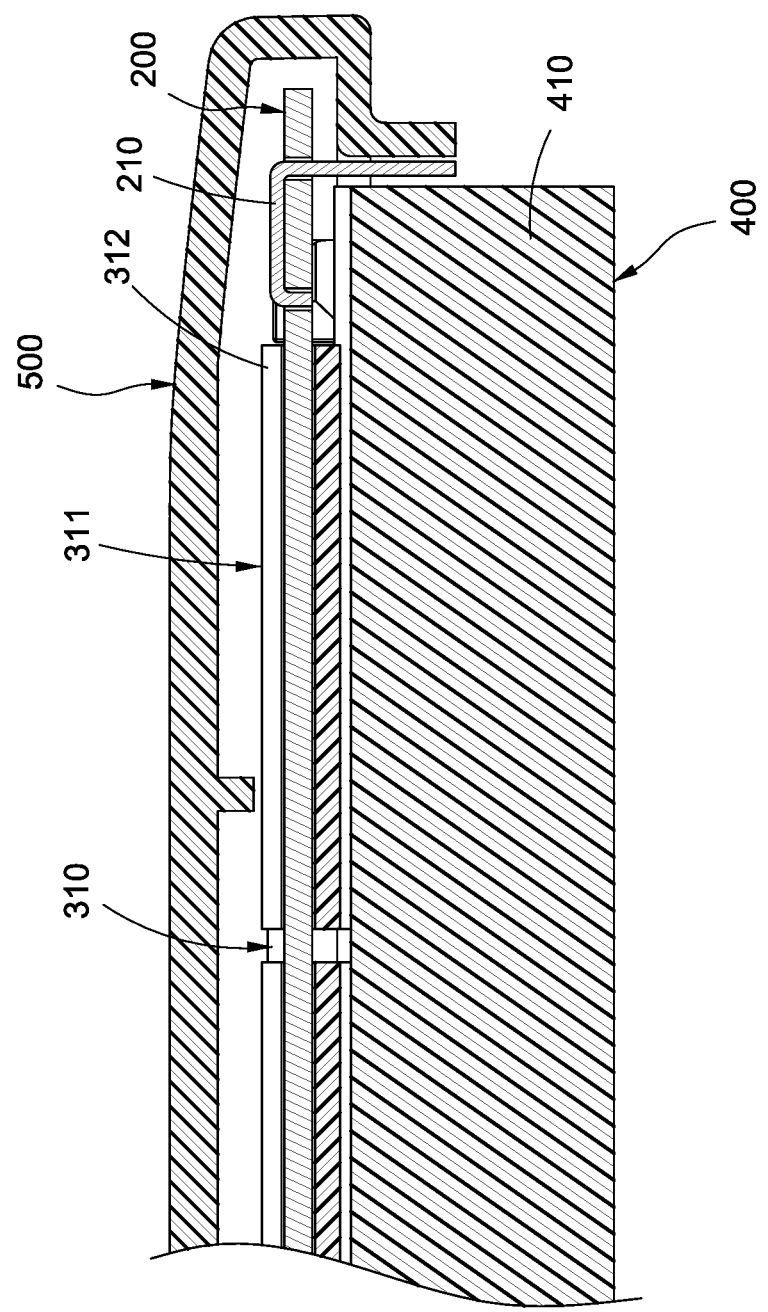

According to this embodiment shown in FIGS. 3, 5 and 8, each connection strip 300 is elastic strips made of elastic rubber. Each connection strip 300 has two sides opposite to each other, a lower rail 320 is disposed on one side, the other side opposite to the lower rail 320 sheathes the elastic arm 200 correspondingly. Specifically, a groove rail 310 is disposed on the side of the connection strip 300 sheathing the elastic arm 200, and the elastic arm 200 is inserted in the groove rail 310. Moreover, each elastic arm 200 is provided with a stopper 210 on the other end thereof for blocking and stopping an end of the connection strip 300 sheathing correspondingly thereon and an end of the scraper 400 on the connection strip 300. Therefore, the connection strip 300 and the scraper 400 connected thereon are prevented from falling from the corresponding elastic arm 200. According to this embodiment, the stoppers 210 are exampled in a manner of pins penetrating the ends of the corresponding elastic arms 200, but this disclosure is not be limited thereto. For example, the stoppers 210 may protrude from the elastic arms 200. The groove rail 310 may have a plurality of frames 311 connected with each other, and the elastic arm 200 passes through the frames 311. Therefore, when the elastic arm 200 is pressed to deform, the groove rail 310 may be deformed following the elastic arm 200 with respect to the gaps between the frames 311, and the motion of the elastic arm 200 is thereby prevented from interference. According to this disclosure, each frame 311 may have a pair of claws 312, and the pair of claws 312 respectively clamp two sides of the elastic arm 200, but this disclosure is not be limited thereto. For example, the frame 311 may be a rectangular ring for the elastic arm 200 to be inserted therethrough.

Figure 9:
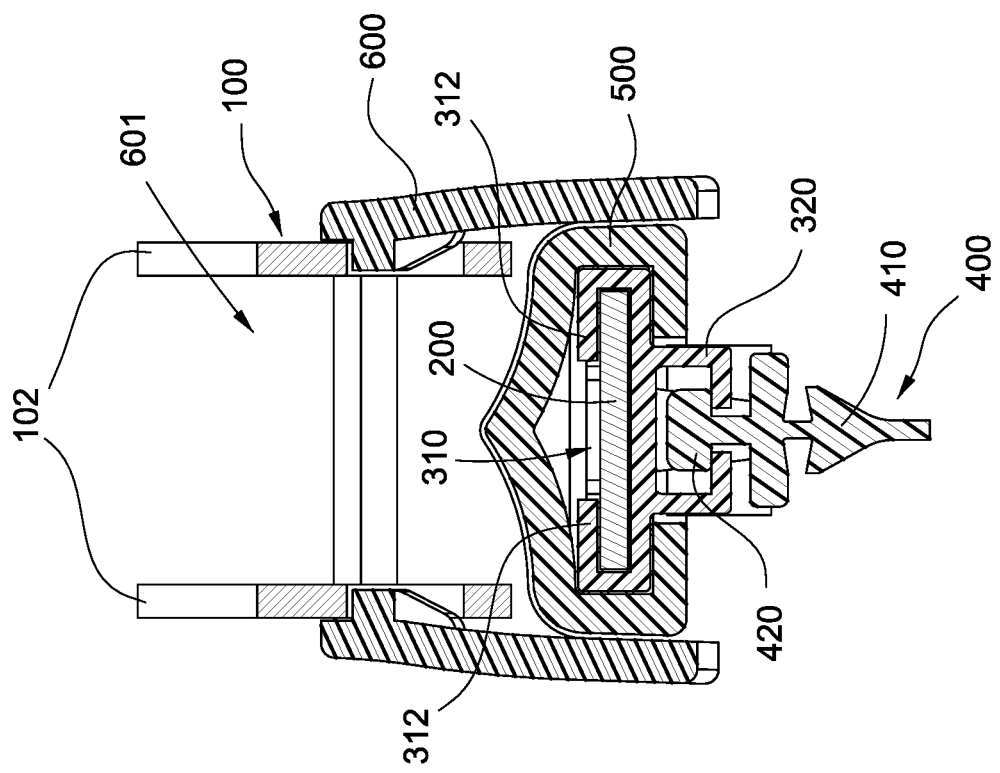
FIGS. 9 and 10 are lateral cross-sectional views of the wiper according to the embodiment of this disclosure at the position shown in FIG. 7.
Figure 10:
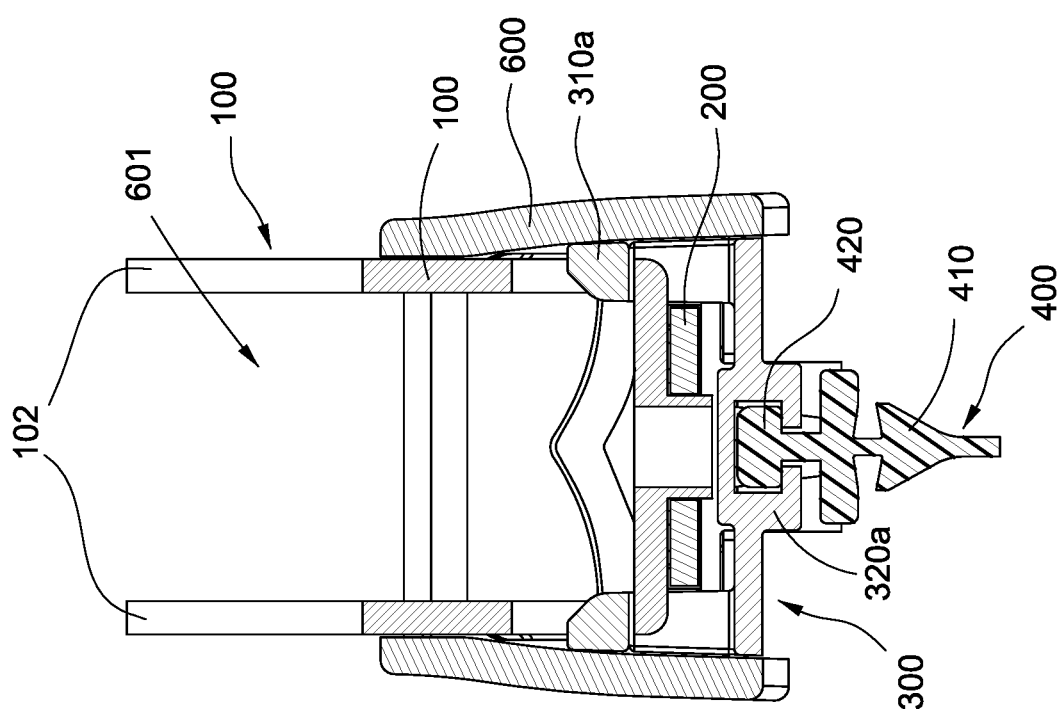

Referring to FIGS. 3 to 4 and 9, a block 300a is connected between the pair of connection strips 300, and a plurality of latches 310a are extended from two side edges of the block 300a for snapping the snapping seat 100. Specifically, the latches 310a are accommodated in the holes 102a disposed on each side wall 102 of the snapping seat 100 to snap an edge of the bottom plate 101, but this disclosure is not be limited thereto. For example, one of the latches 310a may snap an internal edge of one of the holes 102a if the hole 102a of the side wall 102 is not disposed on the root of the side wall 102. According to this embodiment, the two elastic arms 200 are connected on the same side of the snapping seat 100 and the ends of the two elastic arms 200 connected to the snapping seat 100 are separated from each other and clamped between the block 300a and the snapping seat 100. The block 300a may prevent rain water from remaining between the connection strips 300 or between the ends of the two elastic arms 200.

Referring to FIGS. 3 to 5, the scraper 400 is of a strip shape, a blade 410 is formed on a side of the scraper 400, an upper rail 420 is arranged on the other side of the scraper 400 opposite to the blade 410, the upper rail 420 is connected to each lower rail 320 (namely one of the upper rail 420 and the lower rail 320 is inserted to the other), and the upper rail 420 is also connected to the block 300a by sheathing. Specifically, the block 300a has a bridging segment 320a, the bridging segment 320a is connected with the lower rail 320 in a manner of continuous shape so that the pair of lower rails 320 are linked with each other, and the upper rail 420 is connected with the bridging segment 320a by sheathing. Therefore, the upper rail 420 may be inserted into one of the lower rails 320 and further inserted to the other lower rail 320 through the bridging segment 320a.

Referring to FIGS. 1 to 3 and 7 to 8, each spoiler-cover 500 is a strip cover made of plastic, and a ridge is protruded from outer side of the spoiler-cover 500 and extends along a longitudinal direction of the spoiler-cover 500. The spoiler-covers 500 covers each elastic arm 200 respectively, two sides of each elastic arm 200 opposite to each other are respectively provided with the spoiler cover 500 and the connection strip 300 correspondingly, and the spoiler-covers 500 respectively covers the groove rails 310 of the connection strips 300 correspondingly. A portion of the block 300a is connected with the spoiler-cover 500 in a manner of continuous shape and specifically connected between the pair of spoiler covers 500 under the snapping seat 100 to connect with the opening of the spoiler covers 500.

The shield 600 covers the snapping seat 100 and the ends of the spoiler covers 500 connected to the snapping seat 100. Therefore, the two spoiler covers 500 may be connected streamlinedly with each other. Moreover, the shield 600 has an opening 601 for the wiper arm to be inserted to snap the snapping seat 100.

Figure 11:
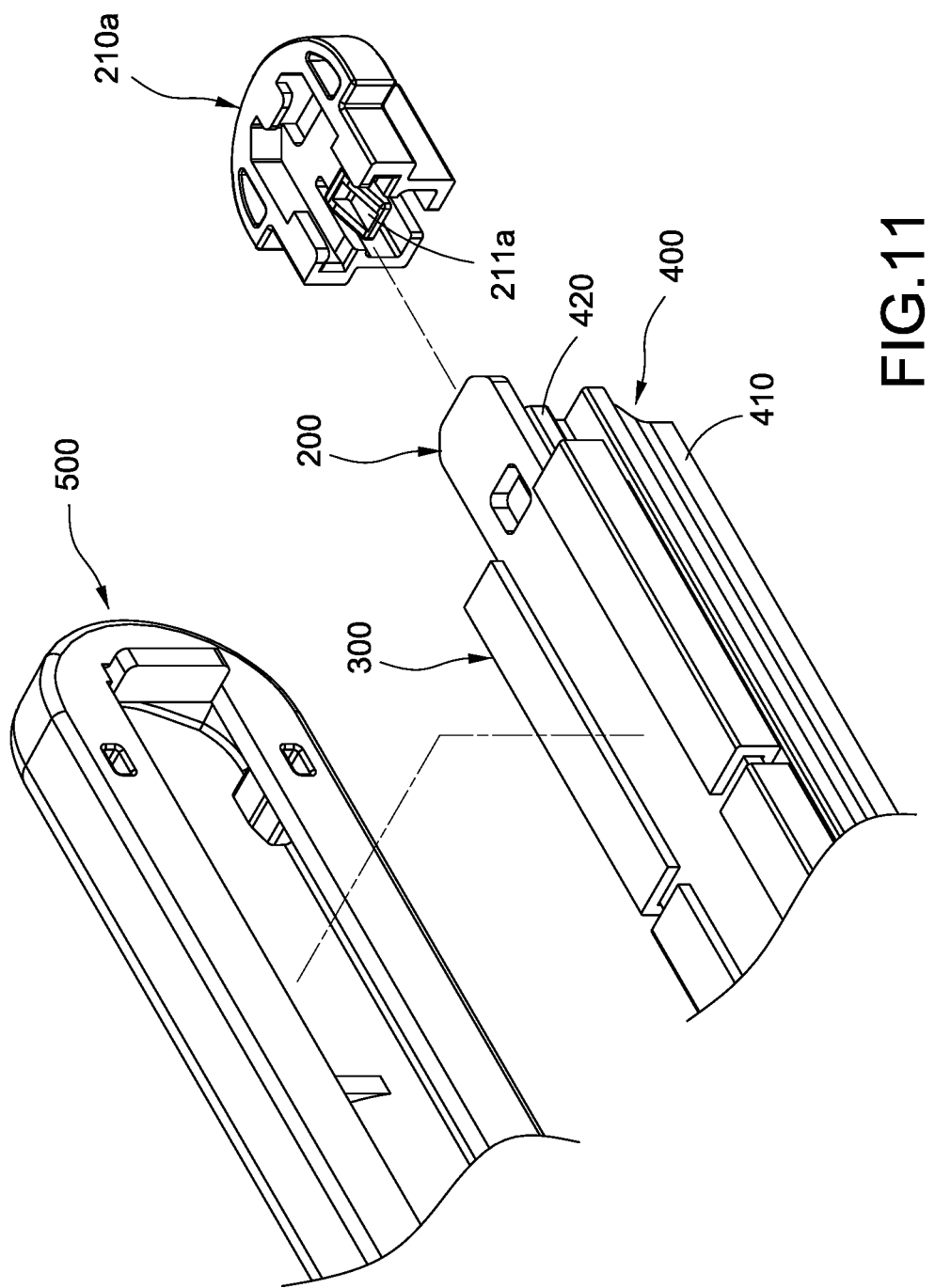
FIG. 11 is a perspective view showing another type of the stopper of the wiper according to the embodiment of this disclosure.
Figure 13:
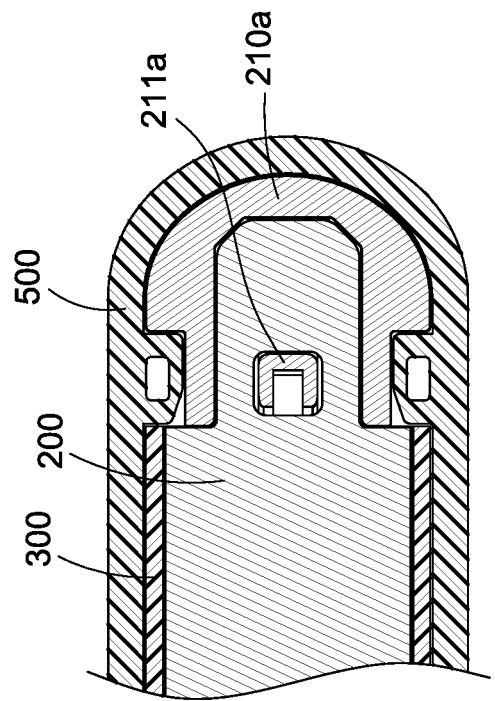
FIG. 13 is another longitudinal cross-sectional view of the stopper shown in FIG. 11.
Figure 12:
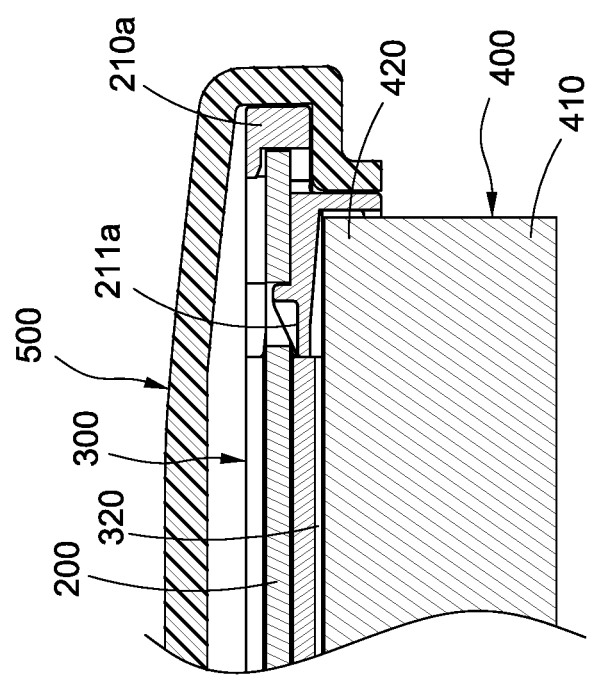
FIG. 12 is a longitudinal cross-sectional view of the stopper shown in FIG. 11.

Further according to another embodiment of the stopper showing in FIGS. 11 to 13, each stopper 210a may be a sheath matching with the shape of an internal surface of the end of the spoiler cover 500. The stopper 210a sheathes on the end of the elastic arm 200, a latch 211a is arranged on the stopper 210a and the stopper 210a is fixed by the latch 211a snapping the elastic arm 200. Furthermore, a portion of the stopper 210a may be continuous in shape with the lower rail 320 of connection strip 300 for the end of the upper rail 420 on the scraper 400 to be inserted.

Accordingly, the wiper of this disclosure has a pair of elastic arms 200 separated from each other which are respectively connected to the snapping seat 100 and further connected with each connection strip 300 by sheathing for the scraper 400 to be conveniently inserted into each connection strip 300. Furthermore, in shorter wiper (on a rear windshield), the elasticity of the wiper may be increased through the two elastic arms 200 arranged separately and the gaps of the plurality of frames 311 of the connection strip 300, and the wiper is thereby prevented from being over rigid.

Although this disclosure has been described with reference to the foregoing embodiment, it will be understood that the disclosure is not limited to the details thereof. Various equivalent variations and modifications can still occur to those skilled in this art in view of the teachings of this disclosure. Thus, all such variations and equivalent modifications are also embraced within the scope of this disclosure as defined in the appended claims.

What is claimed is:

1. A wiper, comprising:
   a snapping seat;
   a pair of elastic arms, one end of each elastic arm connected to the snapping seat and the pair of elastic arms respectively extended from the snapping seat in opposite directions;
   a pair of connection strips, corresponding to the pair of elastic arms, a lower rail disposed on one side of each connection strip and each of the elastic arm sheathed correspondingly in each of the connection strips;
   a scraper, an upper rail disposed on a side of the scraper, and the upper rail sheathed in the lower rail;
   a pair of spoiler covers, each of the elastic arms and each of the connection strips accommodated in each of the spoiler covers, wherein the spoiler covers and the connection strips are disposed correspondingly on two opposite sides of each elastic arm; and
   a shield, covering the snapping seat and an end of each of the spoiler covers connected to the snapping seat,
   wherein each of the connection strips is located between each of the elastic arms and each of the spoiler covers, and the lower rail protrudes from each of the spoiler covers, wherein a block is connected between the pair of connection strips and snapped on the snapping seat.

2. The wiper according to claim 1, wherein the block comprises a bridging segment connected with the pair of lower rails in a manner of continuous shape, the upper rail is sheathed in the bridging segment.

3. The wiper according to claim 1, wherein a groove rail is disposed on each connection strip, and each elastic arm is inserted in a respective groove rail.

4. The wiper according to claim 3, wherein each groove rail comprises a plurality of frames connected with each other.

5. The wiper according to claim 4, wherein each of the frames comprises a pair of claws respectively clamping two side edges of a respective elastic arm.

6. The wiper according to claim 3, wherein each of the spoiler covers covering each of the groove rails correspondingly.

7. The wiper according to claim 1, wherein a portion of the block is connected with one of the spoiler covers in a manner of continuous shape.

8. The wiper according to claim 1, wherein a stopper is disposed on another end of each elastic arm to block each of the connection strips.

9. The wiper according to claim 8, wherein each of the stoppers respectively blocks the scraper.

* * * * *